E. M. WOODWORTH.
INDICATOR FOR CAMERAS.
APPLICATION FILED APR. 5, 1918.

1,356,583.  Patented Oct. 26, 1920.

Witness
Eric Oschinger

Inventor
Edward M. Woodworth
By Frank Keifer
Attorney

UNITED STATES PATENT OFFICE.

EDWARD M. WOODWORTH, OF ROCHESTER, NEW YORK.

INDICATOR FOR CAMERAS.

1,356,583.

Specification of Letters Patent.   Patented Oct. 26, 1920.

Application filed April 5, 1918. Serial No. 226,948.

*To all whom it may concern:*

Be it known that I, EDWARD M. WOODWORTH, a citizen of the United States, residing at Rochester, in the county of Monroe and State of New York, have invented certain new and useful Improvements in Indicators for Cameras, of which the following is a specification.

The object of this invention is to provide a new and improved form of indicating device for cameras which is used for the purpose of indicating to the operator of a camera after each exposure made therewith, that the film must be advanced before another picture is made.

With this and other objects in view this invention presents a combination and arrangement of devices which will be fully illustrated in the drawings, described in the specification and pointed out in the claim at the end thereof.

In the accompanying drawings.

In the several figures of the drawings like reference numerals indicate like parts.

Figure 1:
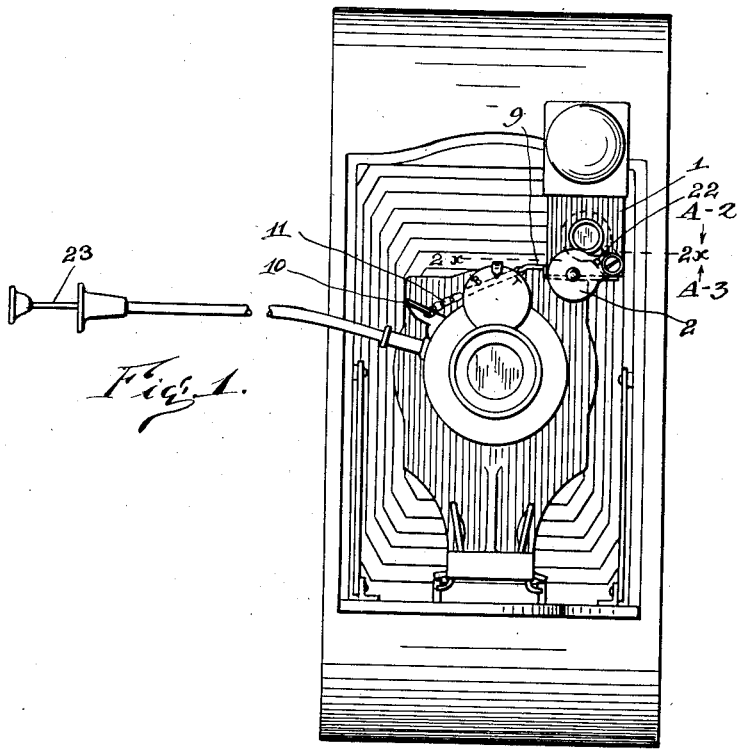
Figure 1 is a front elevation of the camera with the indicating mechanism attached thereto.

The operator of a camera frequently forgets to advance the film in his camera after he has made an exposure with it. This failure in resetting a camera is practically eliminated by the indicating mechanism comprising this invention which in its operation indicates to the operator whenever a previously exposed portion of the film is still in the focusing plane.

The indicating mechanism hereinafter described can be attached to any of the well-known types of cameras which are equipped with a so-called finder or focusing device. This finder must be used by the operator in pointing the camera before taking each picture so that the image of the picture will appear in the finder as it will appear in the picture. For this purpose, I have provided a shutter for this finder that will cut off the field therefrom after each exposure by which the operator will be reminded before he points his camera for another picture that his camera must be reset.

Referring to the drawings, 1 indicates the finder and 2 indicates a swinging shutter which is mounted on the pin 3 on which the finder can be rocked from a vertical to a horizontal position. The pin 3 is mounted in suitable bearings 4 and 5 struck up from the sides of the base plate 6 on which the finder is supported. Mounted to rock around the stud 7 provided on the base plate 6 is a bell crank 8. A link 9 is attached to one end of the bell crank 8 which link in turn, is connected to the operating lever 10 of the camera shutter by means of the flexible cable 11.

Figure 2:
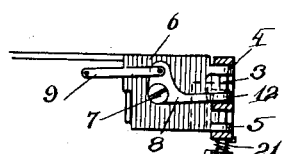
Fig. 2 is a horizontal section of a portion of the indicating mechanism, the section being taken on the line 2x—2x of Fig. 1 looking in the direction of the arrow marked A—2.
Figure 3:
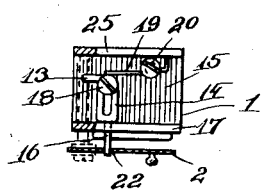
Fig. 3 is a horizontal section of another portion of the indicating mechanism, the section being taken on the line 2x—2x of Fig. 1 looking in the direction of the arrow marked A—3.

The opposite end of the bell crank 8 projects upwardly as shown at 12 in Fig. 2 and engages the laterally projecting extension 13 of the sliding bolt 14. The bolt 14 is mounted to slide on the bottom 15 of the finder 1 and has a reduced end 16 forming a pin, provided at the front end thereof. This pin passes through a suitable opening in the depending lug 17 provided on the finder 1. The bolt 14 has a slot in the middle thereof through which the screw 18 projects into the bottom 15 of the finder 1. The large head of the screw 18 overlaps the bolt 14 and guides it in its endwise movement.

A spring 19 is provided which at its center is wound around the stud 20 and has a bearing thereon. One end of the spring bears against the flange 25 and the other end bears against the rear end of the bolt 14 and forces it outwardly until the pin 16 comes in contact with the swinging shutter 2 of the indicating mechanism.

As previously pointed out the shutter 2 is mounted to swing on the outer end of the pin 3. Coiled around the end of this pin is a spring 21 one end of which engages the depending lug 17 of the finder 1 and the other end of which engages the shutter 2 and normally forces it into the dotted line position shown in Fig. 1.

In order to release the shutter 2 before it can be moved into this position the pin 16 must be withdrawn from the opening 22 provided in the shutter 2, which opening is normally in line with the pin 16 so that it can be forced into it by the spring 19.

The instant the operator of the camera is making an exposure by pressing the push button, the rocking lever 10 swings to the left and pulls on the flexible chain or cable 11 which in turn rocks the bell crank 8 through the link 9.

The rear end of the bell crank in turn forces the bolt 14 rearwardly against the pressure of the spring 19 and disengages the end of the pin 16 from the opening 22 in the shutter 2. As soon as the shutter is thus released it is swung upwardly by the spring 21 and moves in front of the lens of the finder 1.

The vision of the finder is thus obscured and the camera cannot be pointed toward any object by means of it until the shutter 2 is swung back to its original position, in which it is held by the pin 16 which engages the opening 21 as soon as it is in line therewith.

Unless a picture appears in the finder, the operator knows that the camera shutter has been operated and that the film portion located in the focusing plane has been previously exposed so that before operating the shutter for another exposure, the film in the camera must be advanced.

After the film has been advanced, the shutter 2 can be reset to open the finder which then indicates that the film in the camera is ready to receive another exposure.

Figure 4:
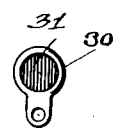
Fig. 4 is a detail view of a modified form of the indicator shutter.
Figure 5:
Fig. 5 is a detail view of a modified form of the indicator shutter.

Instead of using an opaque metal shutter that will cut off all the light from the finder, I may put a window in the shutter made up from a transparent substance like celluloid or glass that is colored red. Such a window will permit light of that color to pass through and color the field of the finder red and thereby warn the operator that the film has not been moved. A shutter made up in this manner is illustrated in Fig. 4, in which reference numeral 30 indicates the frame of the shutter in which the red window 31 is mounted. Instead of using a window made up of a colored transparent material, the window may be left white instead of being colored and the legend "Turn film" may be placed on it as is illustrated in Fig. 5. When such a shutter is used and this legend appears in the finder, it will warn the operator that the film must be turned. A shutter with a window having the legend "Turn film" is illustrated in Fig. 5, in which 32 indicates the frame of the shutter and 33 the window having the legend placed thereon.

In Fig. 5 I have shown the shutter of the indicator bearing the legend "Turn film" as above described.

I claim:

The combination with a camera having a shutter mechanism and a finder, of an indicator comprising a shutter, said shutter being mounted to swing into and out of light-obscuring position relatively to said finder, a spring-pressed bolt engaging said shutter, a crank for disengaging said bolt from said shutter and thereby releasing it, a coiled spring for swinging said shutter on the release by said bolt, a link connecting said crank with said shutter mechanism of said camera to release said shutter on the operation of said shutter mechanism of the camera.

In testimony whereof I affix my signature.

EDWARD M. WOODWORTH.